United States Patent [19]
Boyland

[11] Patent Number: 5,220,709
[45] Date of Patent: Jun. 22, 1993

[54] ROPE TIGHTENING DEVICE

[76] Inventor: Russell Boyland, 136 Evans Road, Wilberforce, N.S.W. 2756, Australia

[21] Appl. No.: 684,909

[22] PCT Filed: Aug. 30, 1990

[86] PCT No.: PCT/AU90/00384
§ 371 Date: Jun. 3, 1991
§ 102(e) Date: Jun. 3, 1991

[87] PCT Pub. No.: WO91/03666
PCT Pub. Date: Mar. 21, 1991

[30] Foreign Application Priority Data
Aug. 30, 1989 [AU] Australia ............................. PJ6045

[51] Int. Cl.⁵ .......................................... F16G 11/14
[52] U.S. Cl. ........................................ 24/130; 410/98
[58] Field of Search ............... 24/129 R, 129 B, 130; 410/98

[56] References Cited
U.S. PATENT DOCUMENTS

| 465,577 | 12/1891 | Kiefer | 24/130 |
| 686,477 | 11/1901 | Priddat | 24/130 |
| 986,014 | 3/1911 | Krenzke | 24/130 |
| 1,278,092 | 9/1918 | Bauer | 24/130 |
| 1,421,026 | 6/1922 | Regan | 24/129 R |
| 2,450,358 | 9/1948 | Romano | 24/130 X |

FOREIGN PATENT DOCUMENTS

| 14365/62 | 8/1963 | Australia . |
| 35698/68 | 10/1970 | Australia . |
| 21476/77 | 7/1978 | Australia . |
| 33646/89 | 10/1989 | Australia . |
| 1029971 | 6/1953 | France . |
| 1116274 | 6/1968 | United Kingdom . |

Primary Examiner—James R. Brittain
Attorney, Agent, or Firm—Sheridan Ross & McIntosh

[57] ABSTRACT

A device (10) to assist manual tightening of a rope passed over a load on a vehicle. In use, the device (10) is first attached to the rope by passing the rope from the upper side of the device (10) through guide (12) to the lower side, then passing the rope up into the lower notch (15) and over the upper side of the device (10) and into the upper notch (14) so that pulling the rope downwardly will secure the device (10) to the rope. Tensioning may then be achieved by forming a loop in a portion of the free end of the rope, passing the loop around a fixed anchorage site on the vehicle and locating a portion of the loop over the pair of arms (16) and (17). The free end of rope is then passed behind and over the portion of rope extending between the pair of arms (16) and (17) and pulled downwardly, thereby urging the rope that extends between the pair of tensioning arms downwardly and causing tension to be applied to the rope. The taut rope is then secured by tying the free end thereof to a fixed anchorage site.

8 Claims, 5 Drawing Sheets

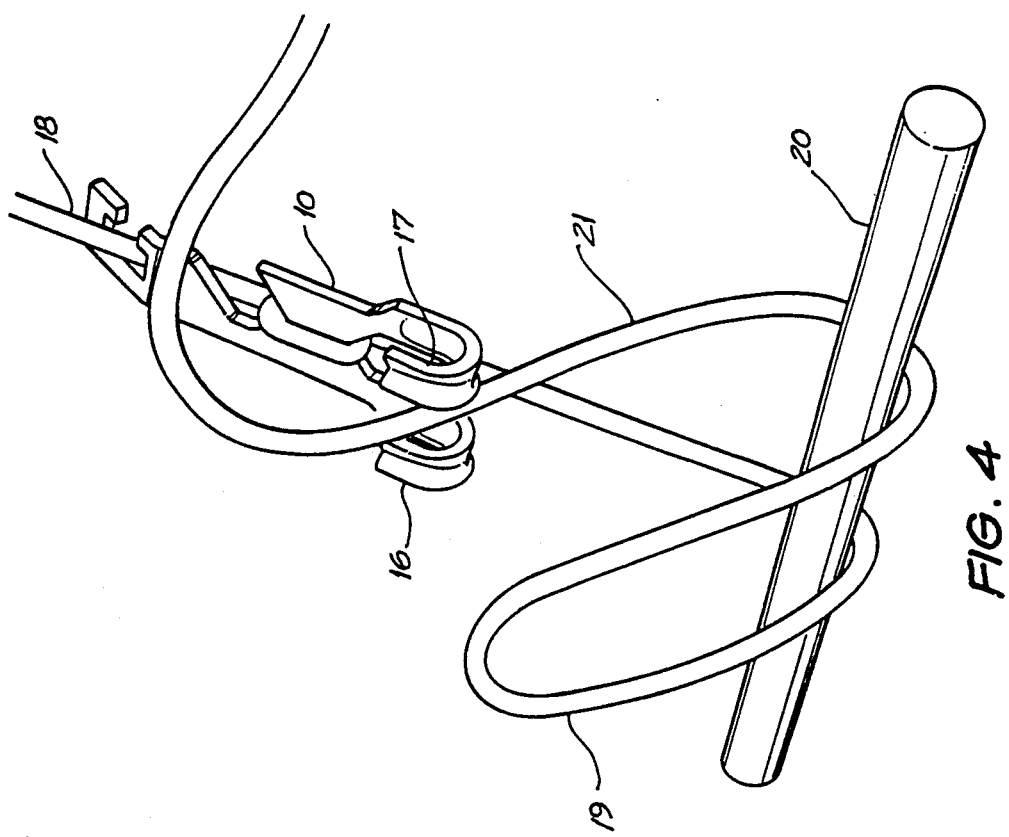
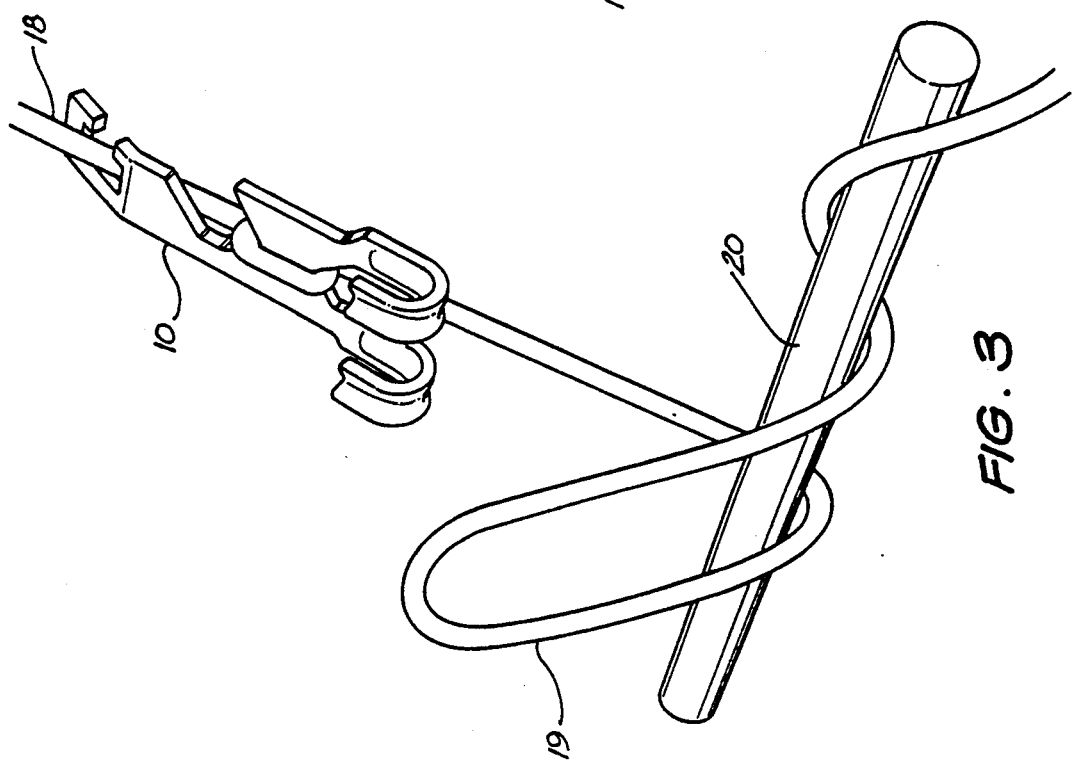

ROPE TIGHTENING DEVICE

FIELD OF INVENTION

This invention relates to a device for securely tightening a rope across a load.

BACKGROUND ART

Commonly, the payload on trucks is stabilised by the process of tying one end of a rope to one fixed point of the truck, extending the other end of the rope around the load, looping the rope about a fixed receiving point, then securely tightening the rope around the load by tying one or more hitch knots, also known as sheep shanks, back along the length of the rope. However, the jolting motion of the truck causes the load to exert a force against the rope, leading to a loosening of the grip of the knot. The risk of the load moving independently of the truck poses a foreseeable risk of danger. Furthermore, the knot itself may threaten to interfere with vehicles passing nearby. For instance the loop of the hitch knot normally extends some distance from the side of the truck when not properly concealed, and can attach to vehicles passing in close proximity.

Earlier Australian patent application no. 33,646/89 by the same applicant discloses a rope tying device having a rope fixing means, a tensioning means and a receiving means, the arrangement being such that a portion of the free end of the rope is fixed to the fixing means and the free end of the rope is passed around a first anchor site external of the device and then a portion of the free end of the rope downstream thereof engages on the tensioning means whereby the rope is maintained under tension and the remaining free end of the rope is passed around a second anchor site external of the device and then secured to the receiving means.

However, that invention suffers from the disadvantage that it cannot produce a triple hitch knot which exerts greater pressure upon the load, thereby adding to load stability. Furthermore, the invention of Australian patent application no. 33,646/89 requires that tying off of the free end of the rope be done on the device. The requirement for tying off on the device necessitates that a receiving means be present on the device which can add considerably to the weight thereof. The weight and size of the device should be kept to as low a level as possible, and a receiving means on the device is an unnecessary contributor of the weight because tying off can be done externally of the device.

DISCLOSURE OF THE INVENTION

It is an object of the present invention to overcome or substantially ameliorate the abovementioned disadvantages.

The present invention contemplates tying off on a fixed point of the vehicle or other structure upon which the load is carried. The weight and size that is saved by removing the receiving means from the device can allow for the addition of a second or more tensioning hooks, thus facilitating the formation of a triple hitch knot to secure the load.

Accordingly, the present invention provides a device for securely tightening the free end of a rope across a load, comprising an elongated member having a rope fixing means and a pair of spaced apart tensioning arms, the arrangement being such that in use the device is substantially vertical with the tensioning arms being substantially horizontal and a first portion of the free end of the rope is fixed to the fixing means and a portion of the remaining free end of the rope is formed into a loop which is passed around a first anchor site external of the device with a portion of the loop being located over the pair of tensioning arms and the free end of the rope being behind and over the portion of the loop extending between the pair of tensioning arms so that when the free end of the rope is pulled downwardly it pulls the portion of the loop that extends between the pair of tensioning arms downwardly to cause tension to be applied to the rope, with the free end of the rope then being secured to a second anchor site external of the device.

The device of the invention has the advantage of providing a frame about which the free end of a rope may be configured in such a way to provide a triple hitch knot that tightly secures the rope to a fixed anchor point on the vehicle or other structure upon which the load is carried.

Preferably, the rope fixing means comprises a guide at the top of the elongated member for allowing a portion of the rope to pass therethrough and a pair of opposed sharply converging V-shaped notches cut out of the elongated member for allowing a portion of the free end of the rope to be looped about 360 degrees around the portion of the device between the two notches, thereby securing the device to the rope. Preferably, the sides and the convergent point of the V-shaped notches are rounded so as not to damage the rope.

The angle of convergence of each of the V-shaped notches and the rope thickness should be such that the rope is jammed into the converged part of each of the notches, thereby restricting the device from moving along the length of the rope.

Preferably, the V-shaped notches are opposed about a line perpendicular to the longitudinal axis of the elongated member.

It is also preferred that the pair of substantially horizontally adjacent tensioning arms be spaced apart at the bottom of the elongated member by a distance greater than three thicknesses of the rope being used.

In a preferred form, the tensioning arms are in the form of hooks. The hooks may be closed and have access therewithin by spring loaded clips.

In a further preferred form, the arms or hooks have a rounded upper surface so as not to damage the rope and so as to facilitate smooth passage of the rope over the tensioning hooks.

BRIEF DESCRIPTION OF THE DRAWINGS

In order that the invention may be more readily understood and put into practical effect, reference will now be made to the accompanying drawings in which:

FIG. 3 is a view of the device of FIG. 1 and a second stage of tying the preferred knot, FIG. 4 is a view of the device of FIG. 1 and a third stage of tying the preferred knot.

Figure 1:
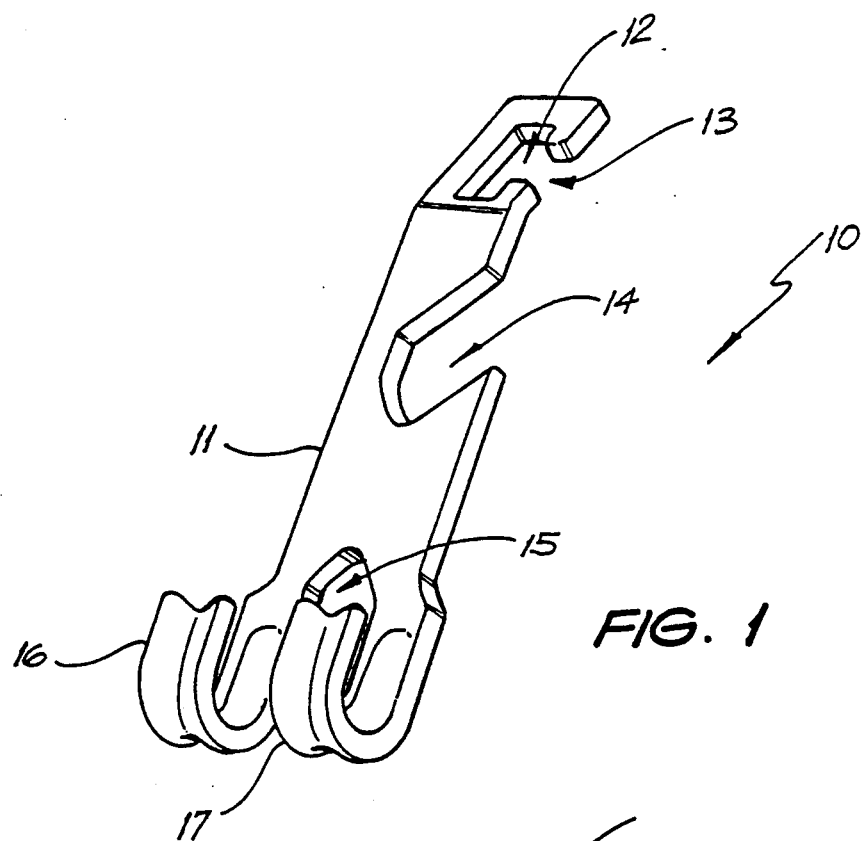
FIG. 1 is a perspective view of a rope tightening device according to a preferred embodiment of the invention.

The rope tightening device 10 of FIG. 1 consists of an elongated member 11 having a guide 12 with a constricted slot opening 13.

The elongated member 11 also has two opposed V-shaped notches 14 and 15. Each of the notches 14 and 15 sharply converge to a rounded point and are opposed about a line perpendicular to the longitudinal axis of the elongated member 11.

The upper notch 14 is accessed from one side of the member 11, whilst the lower notch 15 is accessed from the bottom of the member 11.

The guide 12 and notches 14 and 15 together comprise the rope fixing means that secures the device 10 to the rope.

At the bottom of the elongated member 11 are two arms or hook like projections 16 and 17 that each have a rounded upper surface. As can be seen in FIG. 1, the major portion of the device 10 is planar with the portion containing the guide 12 being offset in one direction and the arms 16 and 17 being offset in the other direction.

The rope tying device of FIG. 1 is used to tighten a rope securely about a load carried on a vehicle. Initially one end of the rope is tied to the vehicle and the other (free) end is passed over the load and placed at the opposite side of the load.

Figure 2:
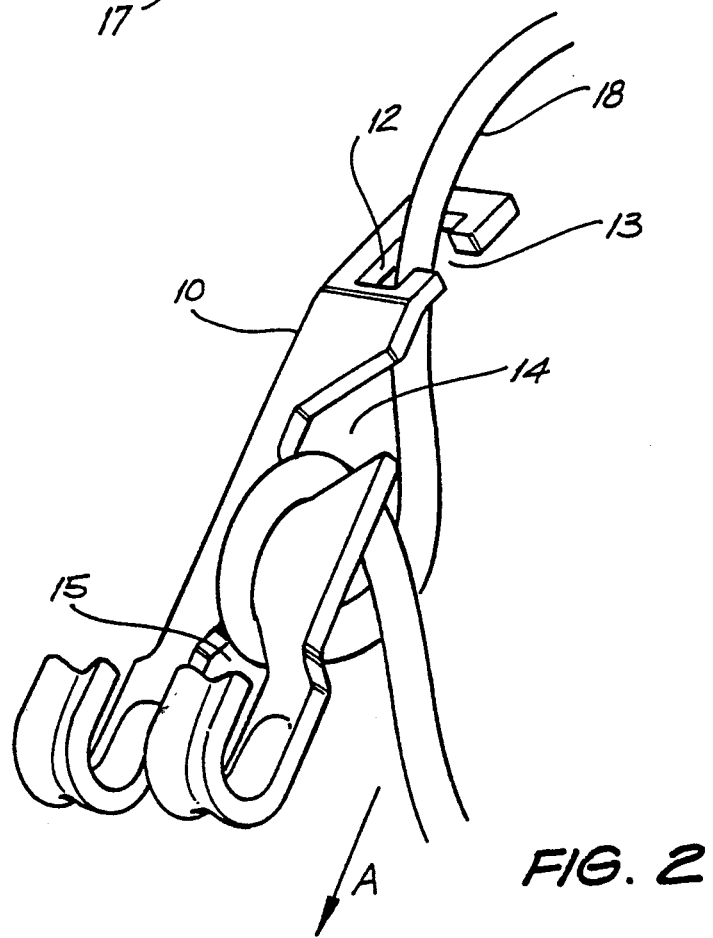
FIG. 2 is a view of the device of FIG. 1 with a portion of rope configured about the rope fixing means as a first stage of tying a preferred knot.

As shown in FIG. 2, the free end of the rope 18 is first passed from the upper side of the device 10 through the guide 12 to the lower side. The remaining free end is then passed through the lower notch 15, over the upper face of the device 10 and into the upper notch 14 so that it constitutes roughly a 360 degree loop about the portion of the device between both notches 14 and 15.

The rope 18 is then pulled downwardly in the direction of arrow A to cause the rope 18 to jam into the sharply converging corners of the notches 14 and 15. The rope 18 that passes through the guide 12 is maintained therein by the constricted slot opening 13 that ensures that the device 10 remains aligned with the rope 18.

In another form of the invention, the guide is closed by not having a slotted opening or has a spring loaded clip providing access thereto, and this may be of benefit in situations where the rope is prone to being jarred out from the guide through the slot.

It is apparent that in this embodiment of rope fixing means, the thickness of rope 18 and angle of convergence of the notches 14 and 15 should be such that a jamming of the rope 18 tightly and immovably to the device 10 is achieved.

As shown in FIG. 3, the free end of the rope 18 is formed into a loop 19 which is passed around a rail 20 of the vehicle (not shown). The remaining free end 21 of the rope is fed between the hooks or arms 16 and 17 as shown in FIG. 4.

Figure 5:
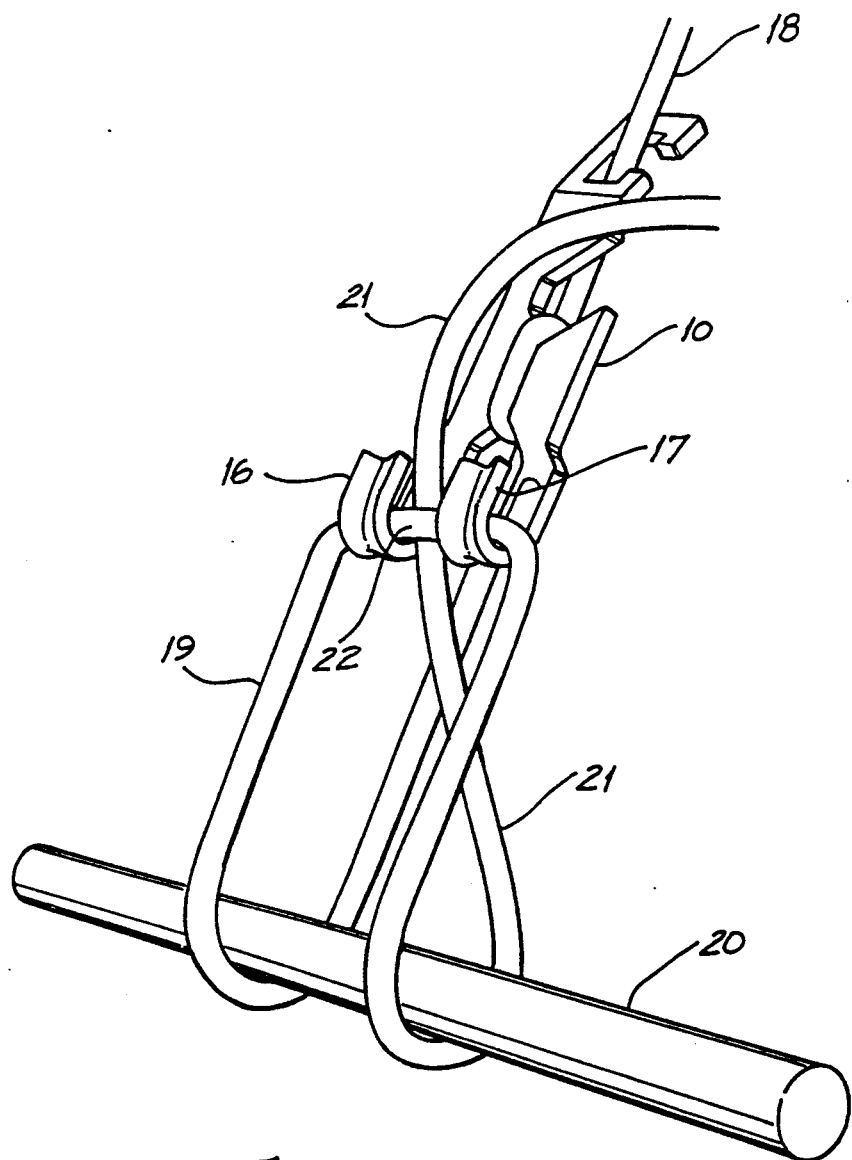
FIG. 5 is a view of the device of FIG. 1 and a fourth stage of tying the preferred knot.

The central portion 22 of the loop 19 is then located over the two hooks 16 and 17 as can be seen in FIG. 5.

In a variation of the method of tying the preferred knot, the central portion 22 of the loop 19 may be first located over the hooks 16 and 17 and the remaining free end 21 of rope may be then passed behind the portion of the loop extending between the hooks 16 and 17.

Figure 6:
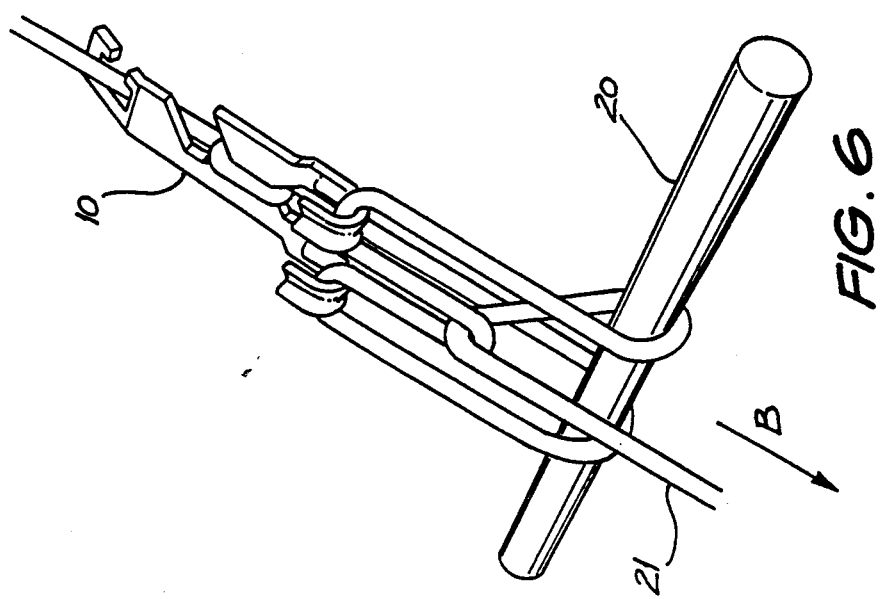
FIG. 6 is a view of the device of FIG. 1 and a fifth stage of tying the preferred knot.

Following either of these alternatives, the free end 21 of the rope is then passed over the central portion 23 of loop 19 and, as shown in FIG. 6, pulled downwardly in the direction of arrow B.

Figure 7:
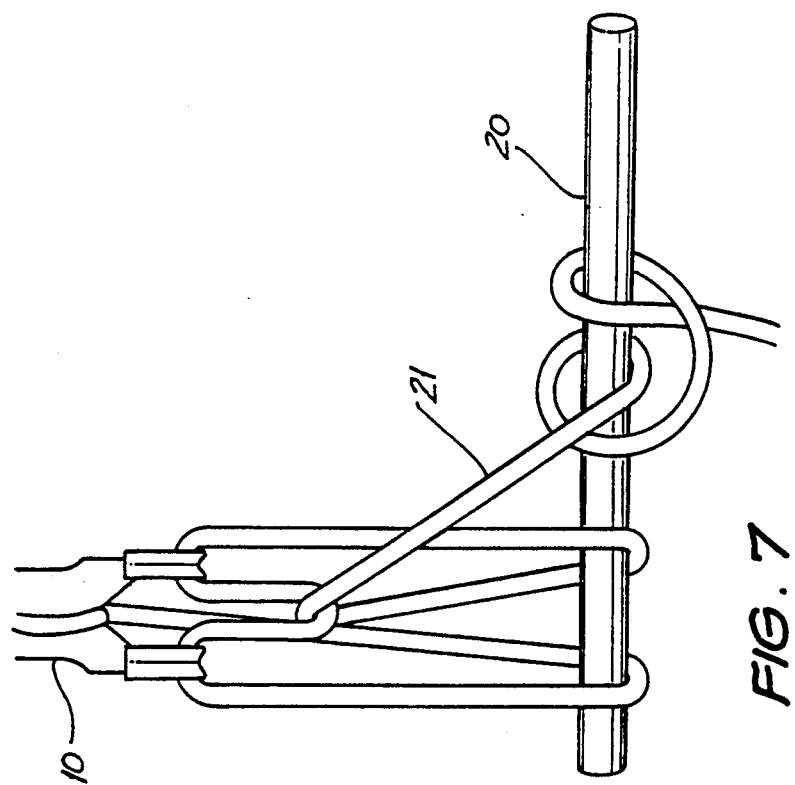
FIG. 7 is a partial view of the device of FIG. 1 and a sixth stage of tying the preferred knot.

The downward pulling of the free end 21 of the rope takes up the slack in the rope between the device 10 and rail 20 and pulls the device 10 closer to the rail 20. This results in the rope being tightened by a triple hitch knot across the load. The free end 21 of rope is then tied off on the rail 20 as shown in FIG. 7.

Figure 8:
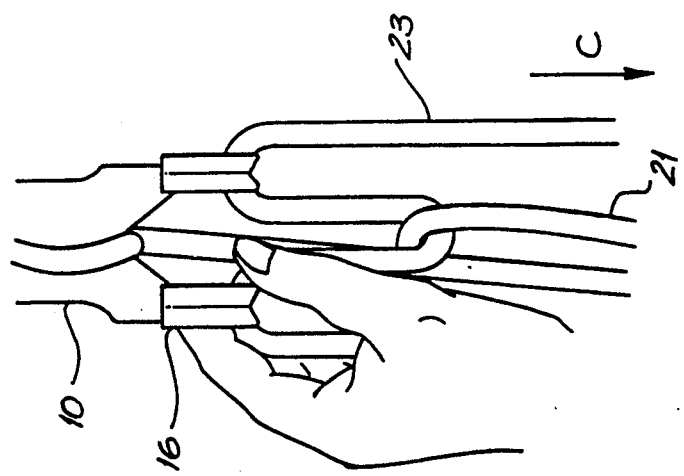
FIG. 8 is a partial view of the device of FIG. 1 and an alternative stage after the fifth stage of tying the preferred knot.

If additional tension is required in the rope before tying off, the user may pinch against the portion of rope that passes over one of the hooks 16 and pull downwardly on the portion 23 of rope in the direction of arrow C as shown in FIG. 8.

Figure 9:
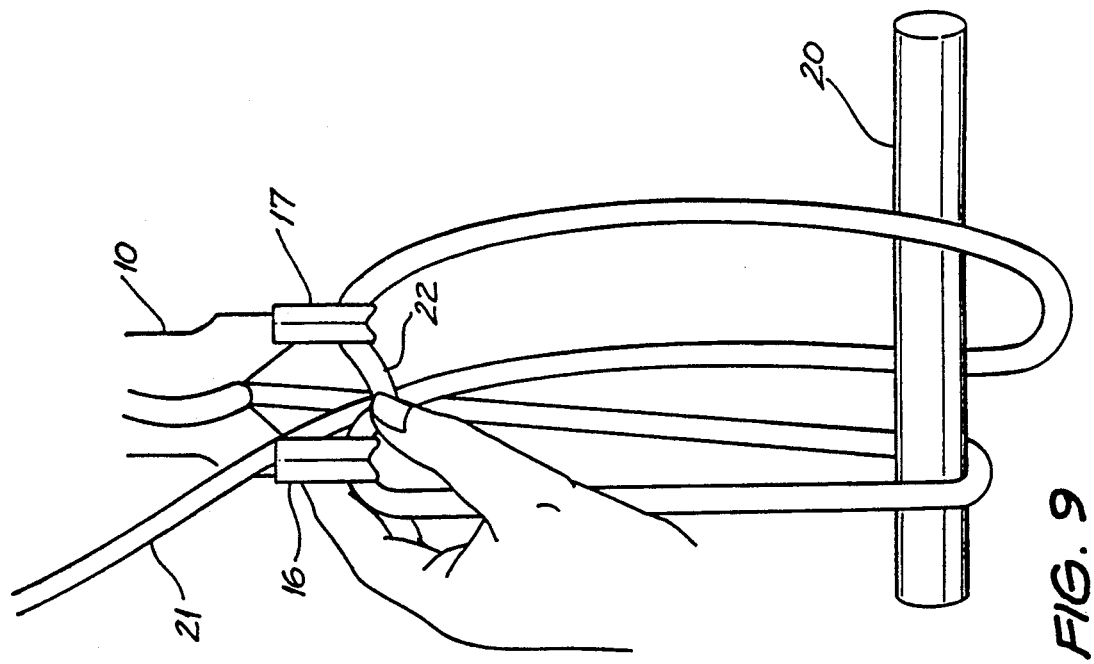
FIG. 9 shows the next stage after that shown in FIG. 8 of tying the preferred knot.

As a result of the manipulation shown in FIG. 8, the length 22 of rope between hooks 16 and 17 is reduced as can be seen in FIG. 9. Whilst still pinching the rope 16, the user may then pull the free end 21 of the rope upwardly to remove the slack caused by the previous manipulation. When the slack has been removed, the free end 21 of the rope may then be pulled downwardly. This may again cause the portion 22 of rope between the hooks 16 and 17 to be pulled downwardly and so the process of pinching and taking up available slack may be repeated until the required tension is achieved or all available slack is taken up. This may be appropriate in the tying down of wool bales or other soft loads. The free end 21 of rope is then tied off on the rail 20.

It is apparent that the length of the free end of the rope from the site at which the device 10 is fixed to the rope 18 must be sufficient to enable the user to perform the manipulations described with respect to FIGS. 3 to 9.

Various modifications may be made in details of design and construction of the device or in the way of tying a knot about the device without departing from the scope or ambit of the invention.

For instance, rather than locate the central portion 22 of the loop 19 over the two hooks 16 and 17 (as in FIG. 5), the central portion 22 of the loop 19 may be located over one hook 16 and the free end of rope may be passed around the anchor site and then around the other hook 17, before tying off at an adjacent anchor site external of the device.

Alternatively, after locating the central portion 22 of the loop 19 over the one hook 16, the free end of rope may be directly tied off at an anchor site external of the device.

I claim:

1. A device for tightening a rope across a load, comprising an elongated member having a top and bottom, a longitudinal axis, a rope fixing means having a pair of upper and lower opposed sharply converging V-shaped notches cut out of said elongated member for allowing a portion of the rope to be looped about a portion of the device between said notches, the angle of convergence of each of said V-shaped notches being such that the rope can be secured by jamming the rope into the converged part of each of said notches, a pair of tensioning hooks and a guide having a constricted slot opening for allowing a portion of the rope to pass therethrough, wherein said tensioning hooks are spaced apart and perpendicular to said elongated member.

2. The device of claim 1 wherein the V-shaped notches are opposed about a line perpendicular to the longitudinal axis of the elongated member.

3. The device of claim 1 wherein the pair of tensioning hooks are spaced apart at the bottom of the elongated member by a distance greater than three thicknesses of the rope being used.

4. The device of claim 1 wherein the hooks have a rounded upper surface.

5. The device of claim 1, wherein the upper notch is accessible from one side of the device and the lower notch is accessible from the bottom of the device.

6. The device as claimed in claim 1, wherein said upper and lower V-shaped notches are opposed about a line perpendicular to said longitudinal axis of said elongated member.

7. A method for securely tightening the free end of a rope across a load using a device comprising an elongated member having a rope fixing means and a pair of spaced apart tensioning arms, the arrangement being such that, in use, the device is substantially vertical with the tensioning arms being substantially horizontal, the said method consisting of the steps of
- (i) fixing a first portion of the free end of the rope to the fixing means,
- (ii) forming a loop in a second portion of the remaining free end,
- (iii) passing the loop around a first anchor site external of the device,
- (iv) locating a portion of the loop over the pair of tensioning arms,
- (v) passing the free end of the rope behind and over the portion of the loop extending between the pair of tensioning arms,
- (vi) pulling downwardly on the free end of the rope so as to urge the portion of the loop that extends between the pair of tensioning arms downwardly and causing tension to be applied to the rope, and
- (vii) securing the free end of the rope to a second anchor site external of the device.

8. A method for securely tightening the free end of a rope across a load using a device comprising an elongated member having a rope fixing means and a pair of spaced apart tensioning arms, the arrangement being such that, in use, the device is substantially vertical with the tensioning arms being substantially horizontal, the said method consisting of the steps of
- (i) fixing a first portion of the free end of the rope to the fixing means,
- (ii) forming a loop in a second portion of the remaining free end,
- (iii) passing the loop around a first anchor site external of the device,
- (iv) passing the free end of the rope between the pair of tensioning arms,
- (v) locating a portion of the loop over the pair of tensioning arms,
- (vi) pulling downwardly on the free end of the rope so as to urge the portion of the loop that extends between the pair of tensioning arms downwardly and causing tension to be applied to the rope, and
- (vii) securing the free end of the rope to a second anchor site external of the device.

* * * * *